US012168392B2

(12) United States Patent
Brand et al.

(10) Patent No.: US 12,168,392 B2
(45) Date of Patent: Dec. 17, 2024

(54) ADJUSTMENT DEVICE FOR AN AIR STREAM INFLUENCING ELEMENT, METHOD FOR ADJUSTING AN AIR STREAM INFLUENCING ELEMENT WITH AN ADJUSTMENT DEVICE, MOTOR VEHICLE PROVIDED WITH AN AIR STREAM INFLUENCING ELEMENT WITH AN ADJUSTMENT DEVICE

(71) Applicant: MCi (Mirror Controls International) Netherlands B.V., Woerden (NL)

(72) Inventors: Marius Brand, Amersfoort (NL); Stephen Alexander George Gustavo Boom, Zeist (NL); Jannick Daniël Wijntjes, Rotterdam (NL)

(73) Assignee: MCI (MIRROR CONTROLS INTERNATIONAL) NETHERLANDS B.V., Woerden (NL)

( * ) Notice: Subject to any disclaimer, the term of this patent is extended or adjusted under 35 U.S.C. 154(b) by 528 days.

(21) Appl. No.: 17/434,599

(22) PCT Filed: Feb. 26, 2020

(86) PCT No.: PCT/NL2020/050125
§ 371 (c)(1),
(2) Date: Aug. 27, 2021

(87) PCT Pub. No.: WO2020/175992
PCT Pub. Date: Sep. 3, 2020

(65) Prior Publication Data
US 2022/0134868 A1 May 5, 2022

(30) Foreign Application Priority Data
Feb. 27, 2019 (NL) ...................................... 2022645

(51) Int. Cl.
*B60K 11/08* (2006.01)
*B62D 35/00* (2006.01)

(52) U.S. Cl.
CPC ............ *B60K 11/085* (2013.01); *B62D 35/00* (2013.01)

(58) Field of Classification Search
CPC ................ B60K 11/085; H02K 7/1166; H02K 2213/06; F16H 37/086; F16H 2702/02; F01P 7/10; F01P 11/14
See application file for complete search history.

(56) References Cited

U.S. PATENT DOCUMENTS

| 4,669,578 A | 6/1987 | Fukamachi |
| 6,889,578 B2 * | 5/2005 | Spaziani .............. H02K 7/1166 74/661 |

(Continued)

FOREIGN PATENT DOCUMENTS

| CN | 103221243 A | 7/2013 |
| CN | 105026812 A | 11/2015 |

(Continued)

*Primary Examiner* — Huan Le
(74) *Attorney, Agent, or Firm* — Volpe Koenig

(57) ABSTRACT

Adjustment device for adjusting an air stream influencing element of a motor vehicle between at least a first position and a second position, comprising a driving unit for adjusting the air stream influencing element between at least the first position and the second position, provided with an input shaft having an input axis and an output shaft having an output axis which is at a distance from the input axis, wherein the driving unit has a first, part which is provided around the input axis of the driving unit, and has a second part, wherein the adjustment device is furthermore provided with a failsafe mechanism, wherein the failsafe mechanism engages the first part of the driving unit, wherein the failsafe mechanism comprises an auxiliary driving motor, separately from a main driving motor of the driving unit.

23 Claims, 6 Drawing Sheets

(56) References Cited

Figure 1:
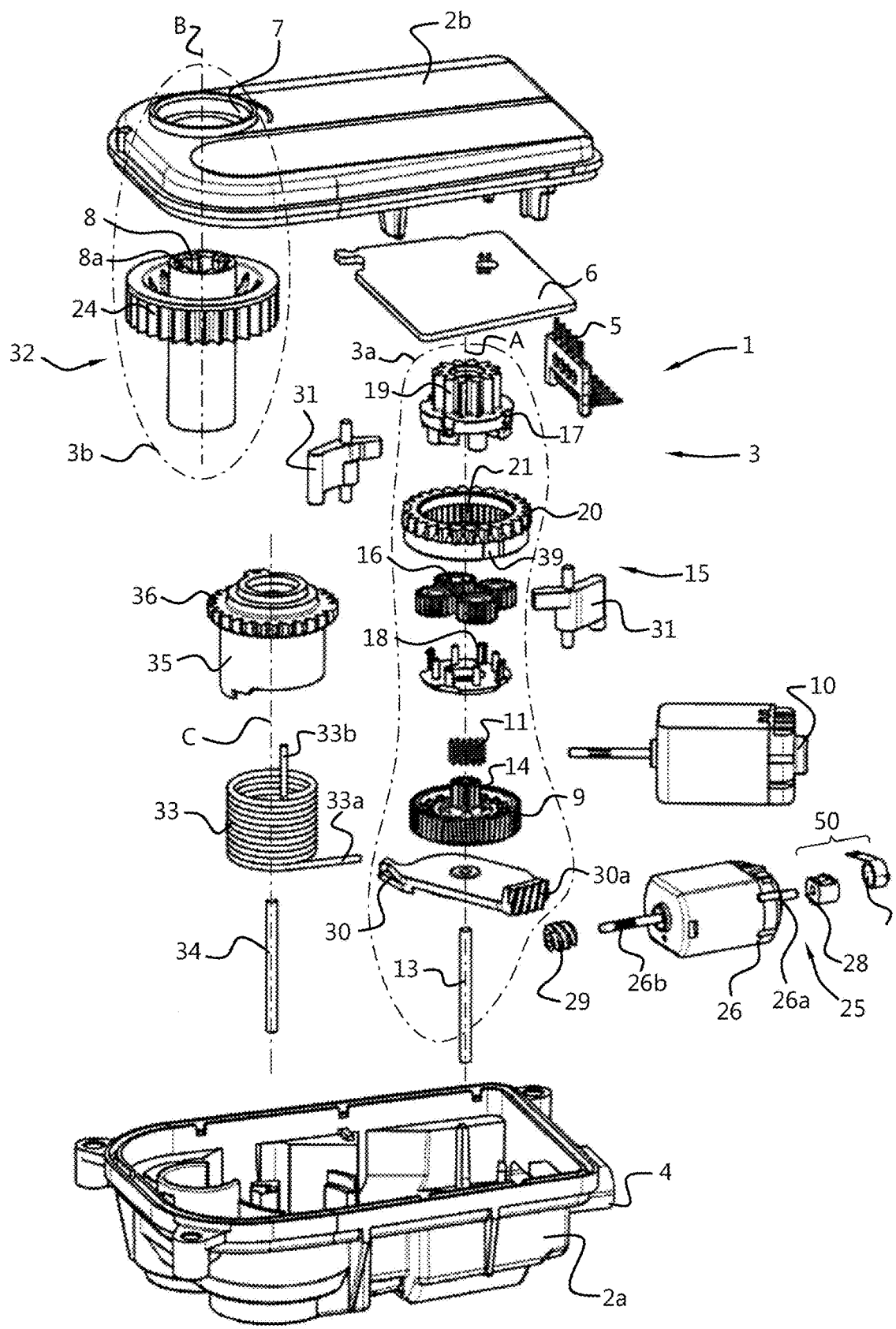

U.S. PATENT DOCUMENTS 9,827,845 B2 * 11/2017 Miyaji .................. F01P 7/12
9,827,848 B1 * 11/2017 Sangha ............... B62D 35/005

FOREIGN PATENT DOCUMENTS

| CN | 111212751 A | 5/2020 |
| --- | --- | --- |
| DE | 3905717 A1 | 8/1990 |
| DE | 102014015070 A1 | 7/2015 |
| KR | 20120050106 A | 5/2012 |
| KR | 101632720 B1 | 6/2016 |
| WO | 2013012337 A1 | 1/2013 |
| WO | 2019045567 A1 | 3/2019 |

* cited by examiner

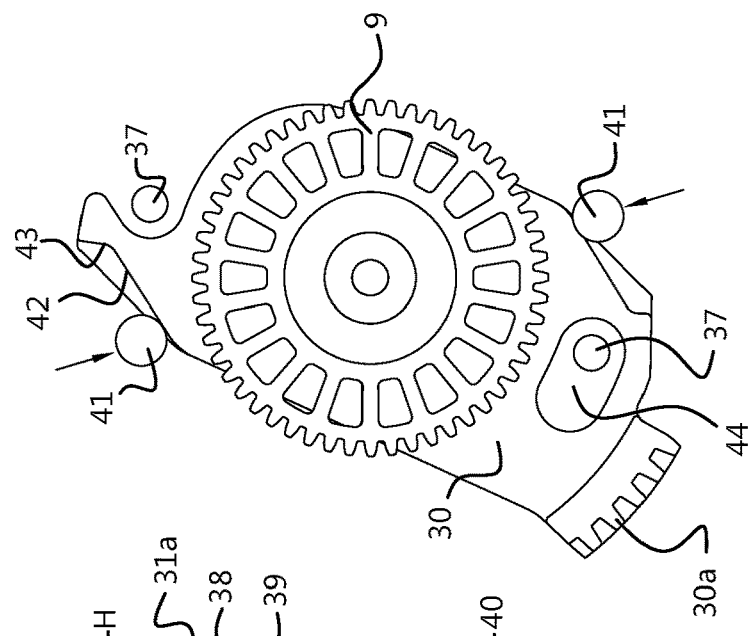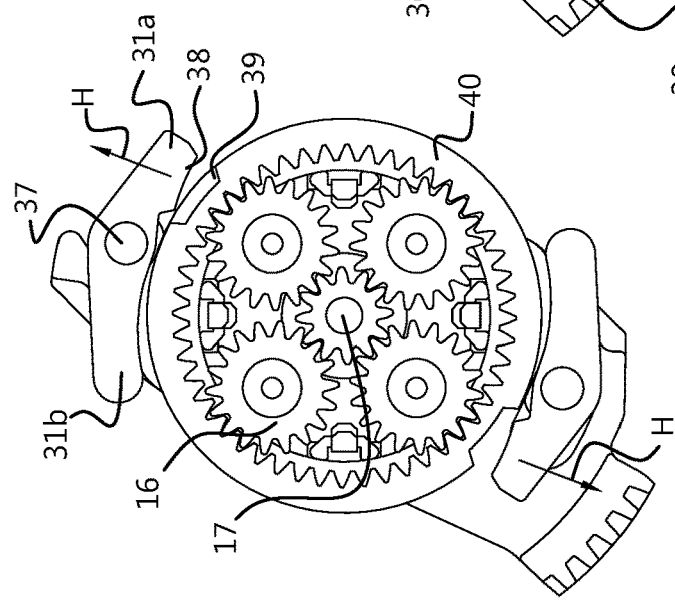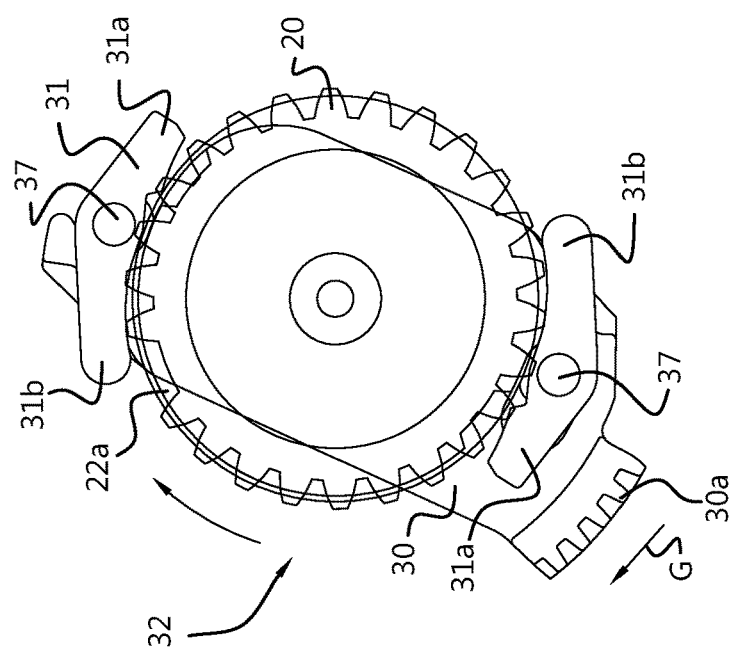

ADJUSTMENT DEVICE FOR AN AIR STREAM INFLUENCING ELEMENT, METHOD FOR ADJUSTING AN AIR STREAM INFLUENCING ELEMENT WITH AN ADJUSTMENT DEVICE, MOTOR VEHICLE PROVIDED WITH AN AIR STREAM INFLUENCING ELEMENT WITH AN ADJUSTMENT DEVICE

CROSS REFERENCE TO RELATED APPLICATIONS

This application is a 35 USC § 371 National Stage application of International Patent Application No. PCT/NL2020/050125, which was filed Feb. 26, 2020, entitled "ADJUSTMENT DEVICE FOR AN AIR STREAM INFLUENCING ELEMENT, METHOD FOR ADJUSTING AN AIR STREAM INFLUENCING ELEMENT WITH AN ADJUSTMENT DEVICE, MOTOR VEHICLE PROVIDED WITH AN AIR STREAM INFLUENCING ELEMENT WITH AN ADJUSTMENT DEVICE" which claims priority to Patent Application No. NL 2022645, filed Feb. 27, 2019 and is incorporated herein by reference as if fully set forth.

The invention relates to an adjustment device for adjusting an air stream influencing element of a motor vehicle.

An air stream influencing element can be, for example, a shutter of an air inlet of a motor vehicle, in particular adjustable strips or flaps of the air inlet. An air stream influencing element can be, for example, a wing which is situated at an outer side of a motor vehicle, or an air dam or spoiler which is situated at an underside of a motor vehicle. The air stream influencing elements, also called air guiding elements, guide or manipulate an air stream in and/or around a vehicle.

It is known to make an air stream influencing element, such as a shutter of an air inlet of a motor compartment, adjustable, whereby the shutter of the air inlet can be adjusted between an open position and a closed position. To this end, the shutter may be provided with elements to be adjusted, for example strips or flaps, which can be adjusted, for example pivoted.

In the closed position of the shutter of the air inlet the air resistance of the vehicle is lowered, which is beneficial to the fuel consumption of the motor. Moreover, where the efficiency of the motor, fuel consumption and $CO_2$ emission are concerned, a motor of a motor vehicle has an optimum operating temperature, which is typically higher than the ambient temperature. A closed air inlet when the motor is cold is then once again beneficial to fuel consumption. Also, during driving with an open air inlet, the temperature of the motor can fall below the optimum operating temperature, so that fuel consumption may increase. Fuel consumption of the motor may also increase at an operating temperature above the optimum operating temperature.

Also an air inlet for cooling a brake provision, such as brake discs, may be provided with a shutter which may be adjustable. Also an air inlet or air supply to other provisions of the motor vehicle, for example the air-conditioning, or the heating, may be provided with a shutter which may be of adjustable design. Such adjustable shutters may especially be intended for guiding an air stream.

A motor vehicle may also be provided with one or more spoilers as air stream influencing elements. Such an air stream influencing element manipulates especially the air flow around the vehicle, in particular seeks to improve the air flow around the vehicle. A spoiler may for instance be situated at the back of the vehicle, or at a side or at a front, and is then often referred to as wing. Particularly at high speeds of the vehicle, such a wing can provide for downward force so as to keep the vehicle stably on the ground. At low speeds, by contrast, such a wing generates mainly resistance, which leads to more fuel consumption. It is hence advantageous to make a spoiler adjustable.

A spoiler is also intended for preventing unwanted air streams around the vehicle, so that resistance can diminish. When a spoiler is situated at a front or an underside, it is also referred to as air dam. In particular when a spoiler, or air dam, is situated at an underside of the vehicle, and there, by influencing air streams, can thus reduce the development of whirls between the underside of the vehicle and the road, the resistance of the vehicle during driving can diminish, which can lead to less fuel consumption. However, when an air dam extends at the underside of the vehicle, it is exposed to obstacles that are on the road, such as a speed bump, or loose chippings or grit. This can lead to damage of the air dam. It may hence be advantageous to make an air dam, in particular an air dam at an underside of the vehicle, adjustable.

It may be advantageous, then, to make an air stream influencing element of a motor vehicle adjustable. To this end, the air stream influencing element is usually coupled with an adjustment device which comprises a driving unit. With the aid of the driving unit, the air stream influencing element can be adjusted between a first position and a second position. When in the case of, for example, a closed air inlet the operating temperature of the motor runs up too high, the air inlet can be opened again to provide for sufficient cooling. A wing or an air dam may be adjusted, for example, between a first position in which it extends substantially along the vehicle and a second position in which it extends at an angle from the vehicle, or between a first position in which it extends relatively far from a side of the vehicle and a second position in which it extends relatively less far from the side of the vehicle.

For an air inlet, solutions are known to allow the air inlet, in case of a failure in the adjustment device, still to be opened when closed. Such a failsafe provision in an adjustment device is used in order to adjust, in case of a calamity, the shutoff elements of the shutter of the air inlet to a predefined position, usually the open position of the shutoff elements.

Such a failsafe provision can also be useful for other air stream influencing elements, such as a spoiler, e.g. an air dam or wing. For an air dam, a failsafe adjustment may be necessary, for example, if an unexpected object on the road surface is detected, which could damage the air dam in unchanged position.

In this regard, publication WO 2013/012337 describes an adjustment device with a failsafe provision for an air inlet, which comprises a spring which is connected with the output shaft of the adjustment device. The spring is retained, against the spring tension, by an arm which is retained under the influence of magnetic force. In the event of a calamity, such as power failure, the magnetic force drops out and the arm moves to release the spring. Under the influence of the spring force, the output shaft of the adjustment device is thus adjusted to the open position.

A disadvantage of the known adjustment device is that it may be relatively voluminous, and does not always fit within the space available in the vehicle. Also, by the use of tolerance-sensitive parts, the reliability of the adjustment device may sometimes leave to be desired. Also, it has appeared that the adjustment device is relatively expensive.

An object of the invention is to provide an adjustment device that counteracts at least one of the above-mentioned disadvantages. In particular, it is desired to provide an adjustment device that can be relatively compact and/or inexpensive and/or reliable.

To this end, the invention provides an adjustment device for adjusting an air stream influencing element according to claim 1.

By providing an auxiliary driving motor, separately from the main driving motor, the failsafe mechanism has its own energy supply which is completely independent of the energy supply of the driving unit. By configuring the driving unit with a first part around the input axis, and a second part, the driving unit can be made quite compact, and can be relatively simply placed in a housing. The first part of the driving unit is always in engagement with the second part. In this way, the air stream influencing elements can also be adjusted during operation of the motor, and not merely at startup and switchoff thereof. The main driving motor is therefore able to adjust the air stream influencing element as long as the main driving motor is energized and the adjustment device is not in a failsafe situation. For this reason too, the driving unit can be compact, because the first part does not need any extra space to move from a non-engaging position to an engaging position. Due to a compact design of the driving unit, the adjustment device can be provided at various points in a vehicle, for example at an air inlet for adjusting air inlet elements or, for example, at an air dam which can be provided at various points on, to or under the vehicle.

As the first part is in engagement with the second part, the adjustment device can be activated to adjust an air stream influencing element while the vehicle is in use, for example when the vehicle is driving. The adjustment device can thus be used also at other times than, for example, solely when starting and/or stopping the vehicle.

Advantageously, the auxiliary driving motor is arranged for merely driving the failsafe mechanism, so that the drive of the adjustment device in normal operating condition is completely independent of the drive of the adjustment device in case of a failsafe situation. In consequence, the drive of the adjustment device, for example a main driving motor, may be so dimensioned that it merely needs to drive the driving unit in a normal operating condition. Also, the auxiliary driving motor can accordingly be specifically dimensioned for merely driving the failsafe mechanism. In this way, both the main driving motor and the auxiliary driving motor can involve relatively limited dimensioning, which can be advantageous as regards cost price.

Advantageously, there is provided an activation element for adjusting the auxiliary driving motor itself, in case of failsafe, and therewith setting the failsafe mechanism in motion further for adjusting the adjustment device, and the air stream influencing element coupled thereto, to the predefined failsafe position. This allows engaging to be done right at the beginning of the failsafe drive train, namely at the auxiliary driving motor. This makes the drive train simpler, so that parts can be made of simpler and/or lower-cost design. The activation element preferably engages the auxiliary driving motor to adjust the auxiliary driving motor to a predetermined failsafe activation position. The activation element can engage the input shaft of the auxiliary driving motor, or the output shaft of the auxiliary driving motor, or the body part of the auxiliary driving motor. The activation element preferably engages the auxiliary driving motor in such a manner that it can adjust the output shaft of the auxiliary driving motor. By adjusting the output shaft of the auxiliary driving motor, the failsafe mechanism is set in motion to eventually adjust the output shaft of the adjustment device and the shutter coupled therewith to the predefined failsafe position of the shutter. The failsafe mechanism engages the first part of the driving unit, and by setting the failsafe mechanism in motion, eventually the output shaft of the driving unit can also be set in motion.

Advantageously, the activation element is connected with the input shaft of the auxiliary driving motor. In this way, the activation element can be accommodated in the adjustment device in a compact manner, and the driving unit, and the adjustment device, can remain compact. The activation element can thus be of relatively simple and inexpensive design, since it should operate the auxiliary driving motor merely in case of failsafe. The rest of the failsafe mechanism is configured such that it follows the adjustment of the auxiliary driving motor in case of a failsafe situation and can adjust the air stream influencing element to a predefined position.

In an embodiment, the activation element is implemented as an elastic element. In a simple manner, the energy stored in such an elastic element, for example for the sake of biasing, or charging, can then be released to adjust the auxiliary driving motor to its predefined failsafe activation position.

By furthermore providing an elastic element as activation element coupled to the auxiliary driving motor, whereby the elastic element is pretensioned (biased) to a failsafe activation position of the auxiliary driving motor, the failsafe mechanism can be made reversible in a relatively simple manner. The elastic element can be a relatively simply and/or relatively inexpensively implemented spring element, for example a rollable leaf spring element or a rubber band. By providing such an elastic element on the auxiliary driving motor, in the event of failsafe, the elastic element can bring the auxiliary driving motor to its predefined failsafe activation position. In normal operation of the air stream influencing element or when the failsafe situation is over, the elastic element can be pretensioned to the failsafe activation position by the energized auxiliary driving motor. For example, in the operational position the auxiliary driving motor can be permanently energized and in case of failsafe the power supply to the auxiliary driving motor can drop out, in consequence of which the elastic element can adjust the auxiliary driving motor to its failsafe activation position. Alternatively, the auxiliary driving motor may be unenergized in the operational position, and in case of failsafe the elastic element can adjust the auxiliary driving motor to its failsafe activation position.

For example, the failsafe activation position of the auxiliary driving motor can be a zero position or a rest position of the auxiliary driving motor which differs from the operational position in which the auxiliary driving motor can be during use. After a failsafe situation the auxiliary driving motor can then be energized again. Thus, the elastic element can be pretensioned again, so that in case of a next failsafe situation, the elastic element can relax towards the failsafe position again and carry the auxiliary driving motor along. In a simple manner, the failsafe mechanism can thus be reversibly or reusably implemented.

Alternatively, the activation element may also be implemented as an energy storage element which comprises one or more capacitors which can be connected with the electrical contact points of the auxiliary driving motor. In case of failsafe, the energy stored in the capacitors is released to adjust the auxiliary driving motor to the failsafe position of the auxiliary driving motor, and thus, through the adjusting of the auxiliary driving motor, to set the further failsafe mechanism in motion to adjust the output shaft of the driving unit to the predefined failsafe position. In such an embodiment, there is not a small spring or rubber band that biases the auxiliary driving motor to its failsafe activation position and the auxiliary driving motor is not continuously energized but the auxiliary driving motor is—unenergized—in the operational position. During normal use, the failsafe mechanism is biased to the failsafe position of the output shaft of the driving unit, and blocked by a brief energization of the auxiliary driving motor. When the auxiliary driving motor has reached its operational position, the auxiliary driving motor can be switched off. This has an influence on the power consumption of the adjustment device.

Also, it may be advantageous in the case of a parking situation. Upon parking, the current supply also drops out, but that is not a calamity for which the failsafe mechanism should be activated. This can be recognized, for example, by the adjustment device or by the driving unit thereof, with the reception of a park signal. Such a park signal may be generated by the central onboard control unit, which announces a park situation. A local control unit, for example implemented on a PCB in the adjustment device, receives such park signal and can consequently prevent the energy being discharged from the capacitors in the absence of power due to parking. In consequence, for example, the adjustment device may continue to be in the same position during parking, or the position of the adjustment device may be adjusted in a controlled manner. By providing energy storage elements such as capacitors, the failsafe mechanism can be reversibly implemented, and also a park position can be made possible in a simple manner.

For example, in case of a failsafe situation, for example a power failure without park signal, the capacitors can be discharged to the auxiliary driving motor. In case a park signal has been received prior to the power failure, there is no failsafe situation involved, and the capacitors do not need to be discharged. Possibly, the capacitors could be discharged via a resistance, not across the auxiliary driving motor, e.g. for the sake of the longevity of the capacitors.

Instead of capacitors, the activation element can comprise a different energy storage element for storing electrical energy, e.g. a battery.

Advantageously, the input shaft of the driving unit is connected with a main driving motor and the output shaft of the driving unit is configured to be connectible with the air stream influencing element. Thus, the adjustment device can be coupled with the air stream influencing element in a compact manner. For example, the adjustment device may be provided with a housing. The main driving motor may be situated in the housing, while the output shaft of the driving unit can extend through the housing, thus to be simply couplable with the air stream influencing element, for example with shutoff elements of the air inlet, with the spoiler or with the air dam. Also, the failsafe mechanism can be implemented to be completely independent of the driving unit, and of the main driving motor.

Advantageously, the first part of the driving unit comprises a planetary gear system, comprising a sun gear, at least one planet gear, a planet carrier and a ring gear, while for example the sun gear is connected with the input shaft. The second part of the driving unit preferably comprises an output shaft element which forms the output shaft of the driving unit. By providing a planetary gear system, the driving unit can be compactly, and also relatively efficiently, implemented to drive the air stream influencing element. In an example, the sun gear may be connected with the input shaft, and, for example, the ring gear may be detachably connected with the fixed world, such as the housing of the adjustment device. Alternatively, another element of the planetary gear system may be connected with the input shaft, for example the ring gear or the planet carrier, and another element may be detachably connected with the fixed world, for example one of the sun gear and the planet carrier, or one of the ring gear or the sun gear, respectively.

The output shaft element of the second part of the driving unit is coupled with a transmission ratio to an output of the planetary gear system, for example the planet carrier. Thus, the transmission ratio between the first part and the second part can be realized in a simple manner.

Advantageously, the failsafe mechanism comprises a blocking device for blocking an element of the first part of the driving unit in normal use and for releasing that element upon failsafe in case of a calamity. For example, an element of the planetary gear system may be blocked in normal use condition and be released upon failsafe. Thus, a detachable element, such as the detachably connected ring gear, may be blocked and released by the blocking device. Advantageously, the blocking device is couplable with the auxiliary driving motor. The auxiliary driving motor can then provide for the blocking of the element of the driving unit with the aid of the blocking device. Thus, the auxiliary driving motor can take care of the actuation of the blocking device. With failsafe, in case of a calamity, usually also the current supply drops out. In the first embodiment, the auxiliary driving motor then does not receive current anymore, but is brought to its own failsafe activation position by the activation element. Due to the blocking device being coupled with the auxiliary driving motor, the blocking device can be adjusted to the release position, thus to release the blocked element of the driving unit, for example the detachably coupled ring gear, so that the output shaft, and the air stream influencing element coupled therewith, can be adjusted to the predefined failsafe position of the adjustment device.

In the second embodiment, in case of failsafe, the auxiliary driving motor briefly receives current through the capacitors, as a result of which the auxiliary driving motor adjusts the blocking device to the release position.

Advantageously, the blocking device can comprise at least one pivotable lever arm, which is couplable with the blockable element. By providing a pivotable lever arm, and by making use of the lever action, with a relatively small driving force yet a relatively high blocking force can be realized, so that the element concerned can be held in a blocked position. Advantageously, the blocking device, and in particular the at least one lever arm, can be coupled with the auxiliary driving motor. The auxiliary driving motor can thus drive the blocking device, notably bring the at least one lever arm to the blocking position. Due to the lever arm being configured to engage the blockable element, the blockable element can be blocked through drive of the lever arm. Advantageously, the lever arm is arranged to engage in a corresponding recess of the blockable element, so that a sufficient contact and/or a sufficient force transfer to block the blockable element is possible. Thus, the lever arm may be connected with a bridge which is rotatably receivable around the axis of the first part of the driving unit and is connectible with the auxiliary driving motor. The bridge can thus be driven or adjusted by the auxiliary driving motor. For example, the bridge may be provided with a gear rack which can be in engagement with a drive worm of the auxiliary driving motor, and, upon drive can make the bridge rotate around the axis. The lever arm may be connected with the bridge, so that a rotation of the bridge makes the lever arm rotate and causes it to engage the blockable element, so that this element is blocked. Thus, the auxiliary driving motor can drive the blocking device in a simple manner, and, by making optimum use of, for example, lever action, the auxiliary driving motor only requires limited dimensioning, so that it can be made of relatively small and relatively inexpensive design.

Advantageously, the failsafe mechanism has a failsafe energy storage element, such as an elastic element, for example a failsafe spring or, possibly, charged capacitors, while the failsafe energy storage element is pretensioned or charged to the failsafe position of the output shaft of the driving unit. Such a failsafe spring is larger and more powerful than, where applicable, the small spring that functions as activation element. Upon adjustment of the auxiliary driving motor to the failsafe activation position of the auxiliary driving motor in case of failsafe, the failsafe energy storage element can also be released, whereupon energy is liberated to adjust the output shaft to the predefined failsafe position. The failsafe energy storage element may be provided as an elastic element, such as a helical spring or a wrap spring or a torsion spring around an axis, which axis is at a distance from the input axis and from the output axis, as a result of which the elastic element is in effect next to the first part and next to the second part of the driving unit. Thus, the driving unit with the failsafe mechanism can be implemented compactly, and also, the driving unit does not sustain any hindrance from the energy storage element, whether biased or not. For example, the failsafe energy storage element may be configured for cooperation with a coupling gear, which coupling gear is couplable with an element of the first part of the driving unit, such that, when the energy of the failsafe energy storage element is liberated, the coupling gear can adjust and, upon this adjustment, carry along the element of the driving unit coupled therewith, to thereby adjust the output shaft to the predefined position. Alternatively, the coupling gear may also be couplable with an element of the second part of the driving unit. Advantageously, the coupling gear is around an axis which is at a distance from the input axis and from the output axis. Thus, the coupling gear can be, as it were, around a third axis, where the third axis is parallel to the input axis and to the output axis. Preferably, the failsafe energy storage element is also around the same axis as the coupling gear, as a result of which the driving unit can be implemented still more compactly. Thus, for example, the failsafe energy storage element may be partly in or around the coupling gear, which contributes to a compact implementation of the driving unit. Alternatively, the failsafe energy storage element and/or the coupling gear can be around the output axis. The axis of the failsafe energy storage element and/or of the coupling gear then coincides with the output axis. This could possibly give a yet more compact implementation.

Further advantageous embodiments are represented in the dependent claims.

The invention relates to an air stream influencing element, such as a shutter of an air inlet or a spoiler, for example an air dam or a wing, provided with such an adjustment device, to a motor vehicle provided with such an air stream influencing element, and to a method for adjusting an air stream influencing element.

Figure 2:
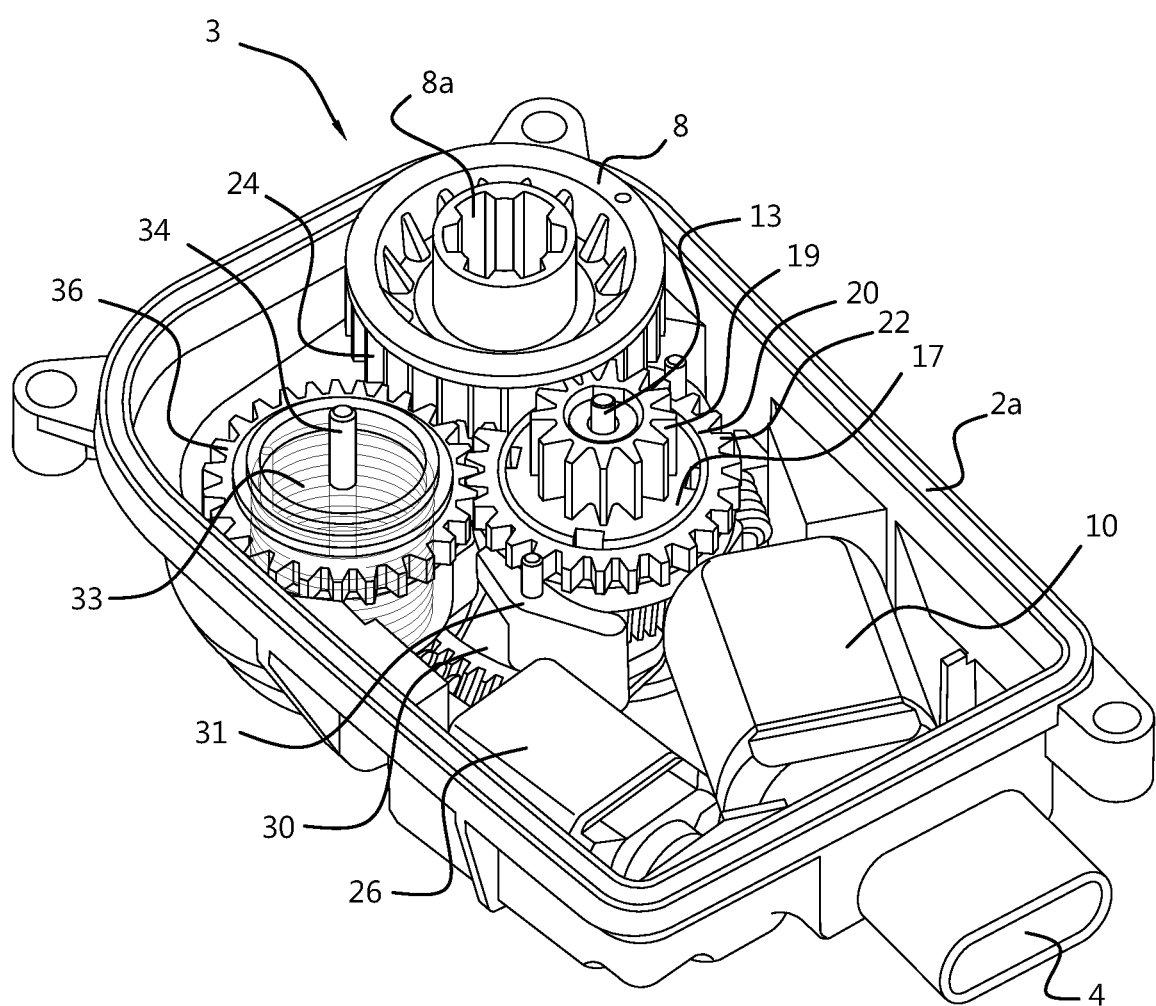
Figure 3:
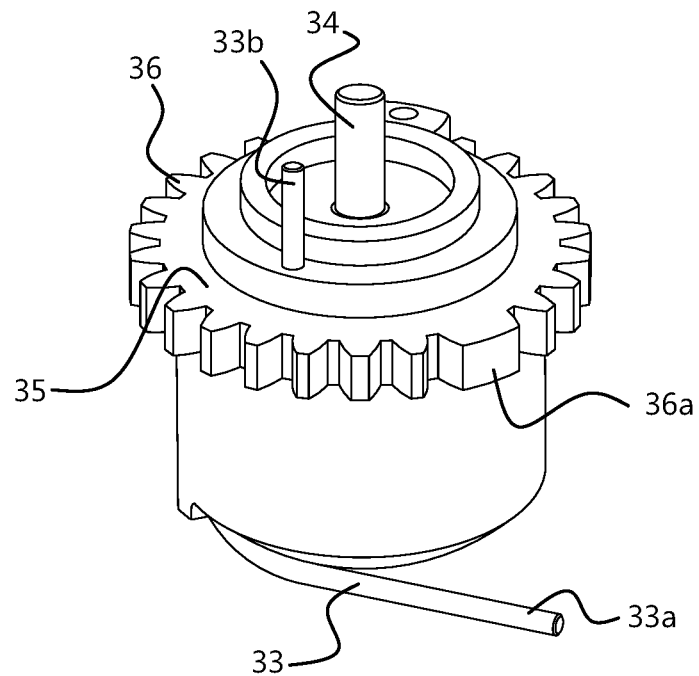
Figure 4:
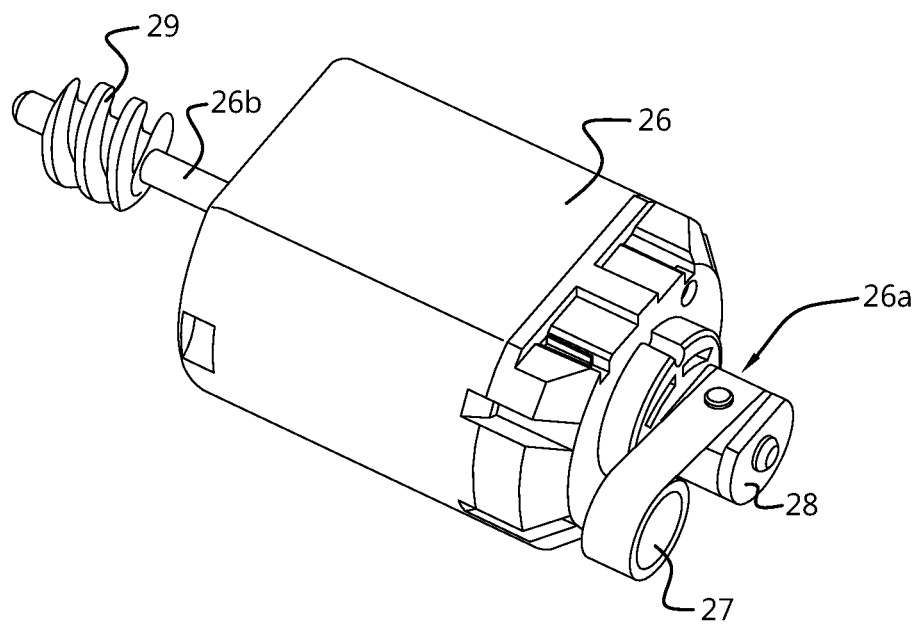
Figure 5A:
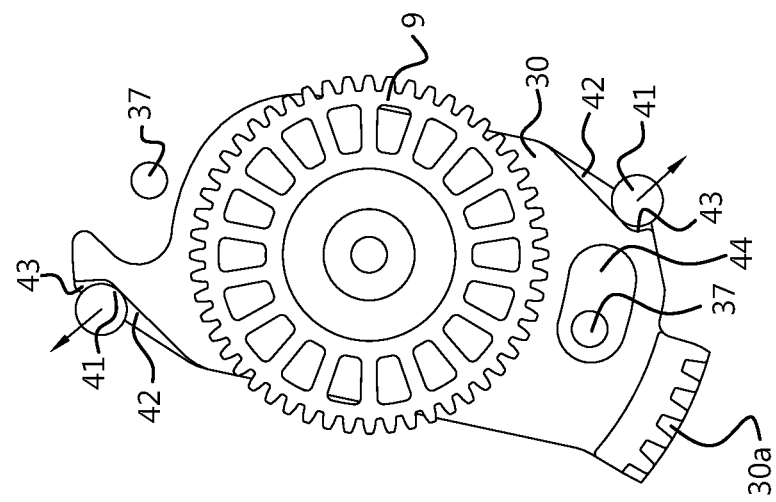
Figure 5B:
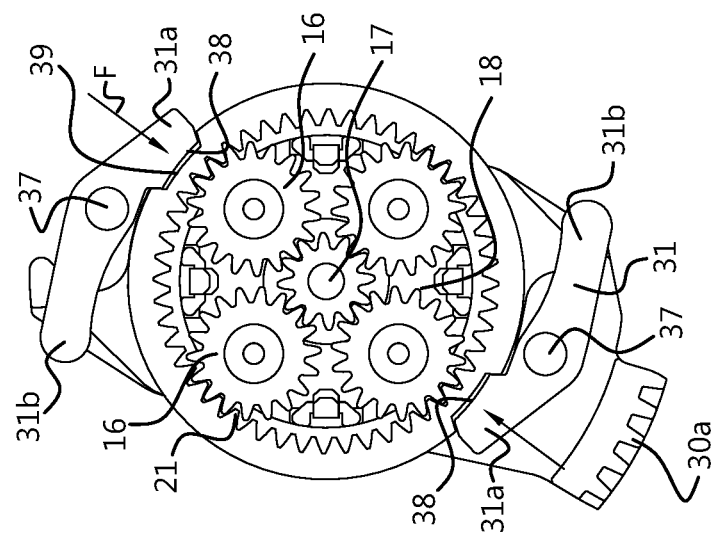
Figure 5C:
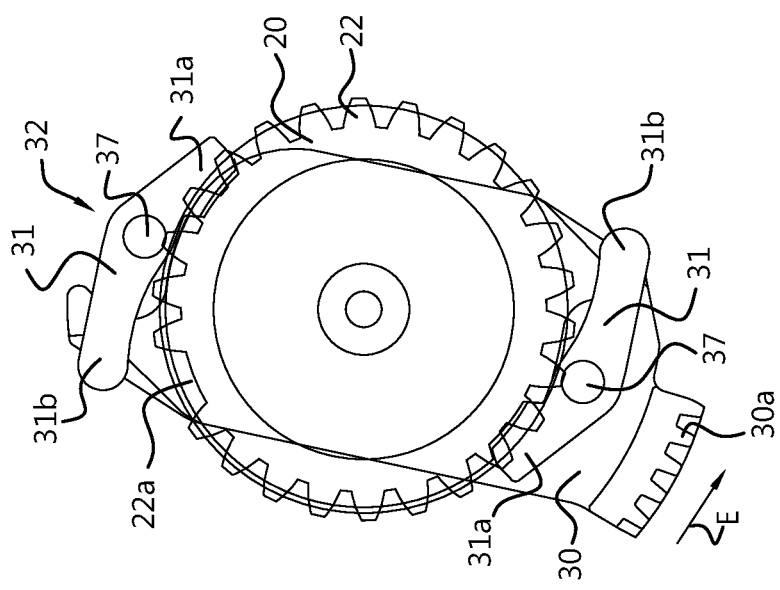
Figure 7:
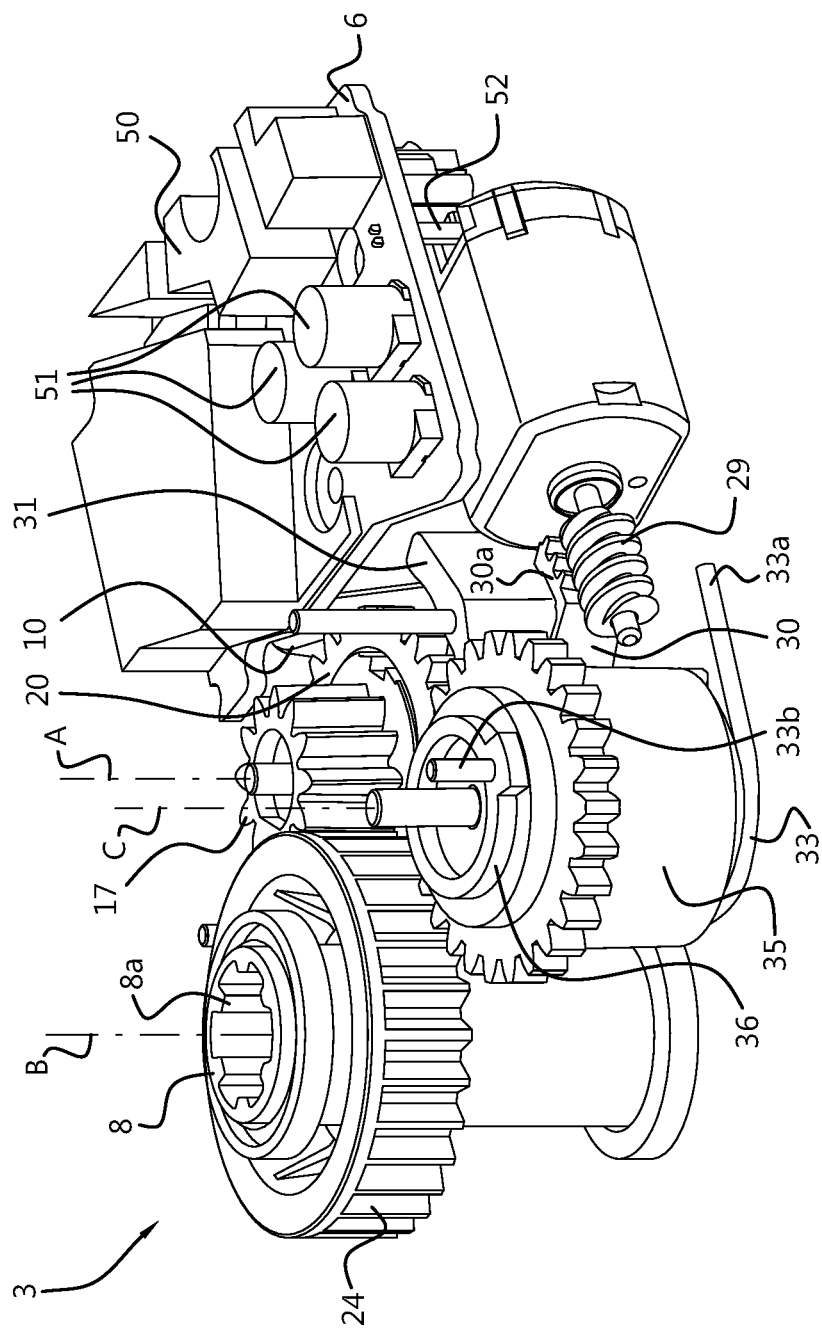

The invention will be further explained on the basis of an exemplary embodiment which is represented in a drawing. The drawing shows in the figures, in:

FIG. 1 an exploded schematic perspective view of an adjustment device according to the invention;

FIG. 2 a schematic perspective view of the driving unit of the adjustment device accommodated in a part of a housing of the adjustment device;

FIG. 3 a schematic perspective view of the failsafe energy storage element coupled in a coupling gear;

FIG. 4 a schematic perspective view of the auxiliary driving motor with elastic element;

FIG. 5a, FIG. 5b, FIG. 5c a schematic top plan view of the blocking device for blocking the blockable element;

FIG. 6a, FIG. 6b, FIG. 6c a schematic top plan view of the blocking device for releasing the blockable element;

FIG. 7 a schematic perspective view of a further embodiment of the driving unit.

It is noted that the Figures are only schematic representations of exemplary embodiments of the invention. Like parts are designated with like reference numerals.

In FIG. 1 there is shown a schematic, perspective exploded view of an adjustment device 1 for adjusting an air stream influencing element of a motor vehicle between at least a first position and a second position. The air stream influencing element can be a shutter of an air inlet of a motor compartment, or of a brake system of the vehicle, which air stream influencing element is usually provided with shutoff elements, such as strips, which are adjustable between a first position, in which the air inlet is substantially closed, and a second position, in which the air inlet is substantially open. The air inlet is not shown here. An air stream influencing element can also be a spoiler which is situated preferably at a front, rear or a bottom of the vehicle. The spoiler may be an air dam or also a wing, or a roof spoiler or a rear spoiler. The air dam may be adjustable between a first position, in which it extends relatively far from the vehicle and a second position, in which it extends less far from the vehicle. For example, the air dam may be at a bottom and/or front of the vehicle. In a first position the air dam can then extend downwards from the vehicle, and in a second position the air dam may then be retracted in or next to the vehicle. An air stream influencing element can also be a wing, which is usually situated at a back or top of the vehicle. The wing may be adjustable between a first position, in which it extends substantially along the vehicle and a second position, in which it extends at an angle from the vehicle, or is at a distance from the vehicle. Air dam or wing are not shown here.

The adjustment device 1 is here provided with a housing 2 and a driving unit 3 which is included in the housing 2. The housing 2 here comprises two parts, a first housing part 2a in which the driving unit 3 is situated, and a second housing part 2b, which is here implemented as a cover to close off the first housing part 2a.

The housing 2 is provided with an entry opening 4 through which a connecting element can be inserted to be connectible to the driving unit 3. The connecting element can be, for example, a plug of an onboard system, such as a LIN bus system, or other system, which is connectible to a corresponding connection element 5 of the adjustment device 1. The connection element preferably comprises at least one power connection to provide electric power to the driving unit. Optionally, the connection element may in addition also have a control connection to bring a control signal to the driving unit and/or to bring a control signal from the driving unit back to the onboard system, for example to a central onboard control unit or, as implemented here, to a printed circuit board 6.

The housing 2 is also provided with at least one exit opening 7 Through the exit opening 7, an output shaft 8, here implemented as an output shaft element 8, of the driving unit 3 can extend, to allow it to be further coupled with the air stream influencing element, for example with strips of the shutter, or with the air dam or with the wing.

The driving unit 3 comprises a first part 3a provided around an input (shaft) axis A, and comprises a second part 3b provided around an output (shaft) axis B. The input axis A is at a distance from the output axis B. Preferably, the input axis A is approximately parallel to the output axis B. The output shaft element 8a is situated concentrically around the output axis B. The output shaft 8 can extend as a hollow shaft element along axis B. Possibly, the output shaft element 8 can extend through the first part 2a of the housing 2 and through the second part 2b of the housing 2 to optionally allow simultaneous drive on both sides of the adjustment device 1. The output shaft element 8 is here provided with an internal toothing into which a corresponding toothing of the air stream influencing element can be inserted to establish a form-closed coupling. Naturally, alternative implementations of the output shaft element 8 are possible. The first part 3a of the driving unit 3 is always in engagement with the second part 3b. In this way, the output shaft element 8 and the air stream influencing element coupled thereto can also be adjusted during the operation of the motor vehicle, and not merely at startup and switchoff thereof. In this way, the driving unit 3 can be made compact in design, because the first part 3a does not require any extra space to move from a non-engaging position to an engaging position.

The first part 3a of the driving unit 3 comprises a main driving motor 10 provided with a worm 11. There is a rod-shaped element 13, a central axis of which coincides with the input axis A. The components of the first part 3a of the driving unit 3 center around this rod-shaped element 13. The worm 11 can cooperate with the input shaft 9, here implemented as an input shaft element 9. The input shaft element 9 comprises a worm gear, which can cooperate with the worm 11, and comprises a sun gear 14 which forms an input of a planetary gear system 15.

The planetary gear system 15 comprises, in addition to the sun gear 14, four planet gears 16, a planet carrier 17 and a ring gear 20. The planet gears 16 are on the one hand carried by the planet carrier 17 and on the other hand supported by the support element 18. The ring gear 20 is provided with an internal toothing 21 which is configured to cooperate with the planet gears 16. In addition, the ring gear 20 is provided with an external toothing 22 which is configured to cooperate with a coupling gear 35.

The planet carrier 17 is provided with an external toothing 19 which is configured to cooperate with an external toothing 24 on the output shaft element 8. The output shaft element 8 can thus be coupled with a transmission ratio to an output, here being the planet carrier 17, of the planetary gear system 15. The transmission ratio is determined by the ratio of the diameter of the external toothing 24 to the diameter of the external toothing 19. In this way, the first part 3a of the driving unit 3 does not sustain the full forces that are on the output shaft 8, but only, in accordance with the transmission ratio, a part of those forces. Because of this, the first part 3a of the driving unit can be lighter and cheaper in design.

The external toothing 19 of the planet carrier 17 is always in engagement with the external toothing 24 of the output shaft element 8. In this way, the output shaft element 8 and the air stream influencing element coupled thereto can also be adjusted during the operation of the motor vehicle, and not merely at startup and switchoff thereof. The main driving motor 10 is hence able to adjust the air stream influencing element as long as the main driving motor 10 is energized and the adjustment device 1 is not in a failsafe situation.

The adjustment device 1 is further provided with a failsafe mechanism 25. The failsafe mechanism 25 comprises an auxiliary driving motor 26 which is separate from the main driving motor 10 of the driving unit 3.

The failsafe mechanism 25 comprises furthermore an activation element 50 which engages the auxiliary driving motor 26. The auxiliary driving motor 26 is provided with the activation element 50 for adjusting of the auxiliary driving motor itself in case of failsafe, in particular of the output shaft 26b of the auxiliary driving motor 26, and therewith further setting in motion of the failsafe mechanism 25. The activation element 50, in this embodiment, is shown in FIGS. 1-4, implemented as an elastic element 27 which is connected via a small connecting block 28 with the input shaft 26a of the auxiliary driving motor 26.

The auxiliary driving motor 26 is provided with an activation element 50, here implemented as comprising an elastic element 27 which is pretensioned (biased) to a failsafe activation position of the auxiliary driving motor 26, and is connected by way of a small connecting block 28 with the auxiliary driving motor 26. Naturally, the elastic element 27 may also be connected directly with the auxiliary driving motor 26. The elastic element 27 thus provides, upon relaxation, for the auxiliary driving motor 26 being brought to the failsafe position of the auxiliary driving motor 26. For example, in normal operating condition the auxiliary driving motor 26 may be energized in a clockwise sense, but in case of failsafe the auxiliary driving motor 26 may have to rotate in a counterclockwise sense. The elastic element 27 provides, in case of failsafe, that the auxiliary driving motor 26 is brought to the failsafe position, or, in the case of the example, will rotate in counterclockwise sense. By bringing the auxiliary driving motor 26 to its own failsafe position, the failsafe mechanism 25 can be activated, to thus proceed, via the failsafe mechanism 25, to bring the air stream influencing element coupled with the output shaft 8 to the failsafe position. The failsafe position of the air stream influencing element is a predefined position into which the air stream influencing element is brought in case of a calamity, this can be the first position or the second position or an intermediate position of the air stream influencing element. For example, the failsafe position of an air inlet can correspond to an open or a closed position of the shutoff elements of the air inlet. Or, the failsafe position of a spoiler or air dam may for instance be a swung-in or retracted position of the spoiler or air dam.

The elastic element 27 is preferably connected with an input shaft 26a of the auxiliary driving motor 26, via a small connecting block 28. The output shaft 26b of the auxiliary driving motor 26 is connected via a worm 29 with a bridge 30. The bridge 30 is provided with an external toothing 30a which is in engagement with the worm 29. The bridge 30 is rotatably included around the rod-shaped shaft element 13 of the input axis A. With the bridge element 30, also at least one lever arm 31 is pivotably connected. In this exemplary embodiment, two lever arms 31 are provided which are mounted on the bridge element 30 diametrically with respect to each other. The lever arms 31 are part of a blocking device 32 for blocking an element of the first part 3a of the driving unit 3. Here, the lever arms 31 block the ring gear 20. During normal use of the driving unit 3, the ring gear 20 is blocked, that is, retained, by the lever arms 31. In case of a calamity, in a failsafe situation, the lever arms 31 release the ring gear 20 and the ring gear 20 can rotate.

Furthermore, the failsafe mechanism 25 comprises a failsafe energy storage element 33 which is arranged around an axis C. The axis C is at a distance from the axis A and at a distance from the axis B. Preferably, the axes A, B, C are parallel to each other. A rod-shaped shaft element 34 of which a central axis coincides with the axis C is provided, around which the failsafe energy storage element 33 is positioned. Alternatively, the axis C can coincide with the output axis B.

The failsafe energy storage element 33 is here implemented as an elastic element, for example a helical spring or a wrap spring. The failsafe energy storage element 33 is connected by one end 33*a* with the fixed world, being the housing 2, and is connected by another end 33*b* with a coupling gear 35. The failsafe energy storage element 33 is pretensioned to the failsafe position of the air stream influencing element.

The coupling gear 35 is arranged in a compact manner concentrically around the axis C and the rod-shaped shaft element 34. The coupling gear 35 is provided with an external toothing 36 which is in engagement with the external toothing 22 of the ring gear 20. In normal operating condition, the ring gear 20 is retained by the lever arms 31, the failsafe energy storage element 33 is pretensioned and blocked by the coupling gear 35. In case of a calamity, the elastic element 27 can adjust the auxiliary driving motor 26, as a result of which the bridge 30 rotates around the axis A. By rotation of the bridge 30, the lever arms 31 unblock the ring gear 20, so that this ring gear 20 can move freely. As the ring gear 20 is freely movable, and hence also the coupling gear 35 is movable, the energy locked in the failsafe energy storage element 33 can be released and cause the coupling gear 35 and hence the ring gear 20 to adjust. By adjustment of the ring gear 20, and given the condition of the sun gear 14 as a result of the non-driven worm gear being preferably in a self-locking manner in engagement with worm 29, the planet carrier 17 is also set in motion, which then sets the output shaft element 8 in motion so as to bring the air stream influencing element to the predefined failsafe position.

FIG. 2 shows a partly cutaway schematic view of an assembled adjustment device 1. The cover part 2*b* of the housing 2 has been omitted, which renders the driving unit 3 visible. By providing a first part of the driving unit 3 around a first axis, a second part around a second axis, and a part of the failsafe mechanism 25 around a third axis, with the axes being substantially parallel to each other, the driving unit 3 can be implemented compactly and with a low overall installation height. Due to the auxiliary driving motor 26 being also merely provided to drive the failsafe mechanism 25, the auxiliary driving motor 26 can also be made of smaller design than the main driving motor 10, as a result of which it consumes less energy and takes up less space than the main driving motor 10.

The external toothing 19 of the planet carrier 17 is always in engagement with the external toothing 24 of the output shaft element 8. In this way, the output shaft element 8 and the air stream influencing element possibly coupled thereto can also be adjusted during the operation of the motor vehicle, and not merely at startup and switchoff thereof. The main driving motor 10 is hence able to adjust the air stream influencing element as long as the main driving motor 10 is energized and the adjustment device 1 is not in a failsafe situation.

In FIG. 3 it is shown that here the failsafe energy storage element 33 implemented as elastic element, a spring, is accommodated in the coupling gear 35. The second end 33*b* of the spring 33 has here been guided through an opening in the coupling gear 35, as a result of which the second end 33*b* is fixedly connected with the coupling gear 35. The external toothing 36 of the coupling gear 35 is provided with a tooth 36*a* which corresponds to a recess 22*a* in the toothing 22 of the ring gear 20, for example shown in FIG. 5*a* or FIG. 6*a*. By providing a tooth 36*a* which is receivable in a corresponding recess 22*a*, the end of an adjusting stroke can be determined. When upon adjustment of the coupling gear 35 relative to the ring gear 20 the tooth 36*a* falls into the recess 22*a*, the end of the adjusting stroke has been reached, and therewith the failsafe position of the air stream influencing element. Thus a predefined position as failsafe position of the air stream influencing element can be determined.

FIG. 4 shows a detail of the auxiliary driving motor 26, being provided on the input shaft 26*a* thereof with the elastic element 27, as activation element 50, which is connected through a small connecting block 28 with the input shaft 26*a* of the auxiliary driving motor 26. Alternatively, the elastic element 27 may also be connected with the output shaft 26*b* of the auxiliary driving motor 26. Here, the output shaft 26*b* is provided with a worm 29 which is arranged to be in engagement with the bridge element 30, in particular with the toothing 30*a* of the bridge element 30.

FIGS. 5*a-c* and FIGS. 6*a-c* give a schematic representation of the blocking (FIGS. 5*a-c*) and the unblocking (FIGS. 6*a-c*) of the ring gear 20 by means of the blocking device 32. The blocking device 32 is part of the failsafe mechanism 25 and comprises the bridge element 30, with the lever arms 31 pivotably connected therewith. The lever arms 31 are pivotable around a pivot 37. The lever arm 31 has a first arm part 31*a* and a second arm part 31*b*, which extend on opposite sides of the pivot 37.

The first arm part 31*a* is provided with a projecting element 38 which functions as blocking element, and which is configured to engage in a corresponding recess 39 of the ring gear 20. The ring gear 20 is provided at an upper part thereof with the external toothing 22, and extends to an underside as a ring. The ring is provided with the recess 39. The external toothing 22 is provided with a recess 22*a* in which a tooth 36*a* of the coupling gear 35 can engage. The ring is provided with the internal toothing 21 in which four planet gears 16 engage.

The second arm part 31*b* is provided with a guide element 41 in the form of a rod-shaped element. The guide element 41 is configured to guide along a guide surface 42 of the bridge element 30. Each guide surface 42 is provided with an end element or a stop element 43 which provides a stop of the guide element 41 to indicate the end of the stroke of the guide element 41. The opposite end of the stroke of the guide element 41 is realized by the projecting element 38 of the first arm part 31*a* which engages in the recess 39.

The pivot 37 of one lever arm 31 can, on a side of the bridge element, move freely alongside the bridge element 30. The pivot 37 of the opposite lever arm 31 is movable in a slot 44 of the bridge element 30. Alternatively, the bridge element 30 may be provided on both sides with a slot 44 in which the respective pivots can move. Or, possibly, one lever arm or more than two lever arms may be provided. By confining at least one pivot 37 in a slot 44 in a movable manner, the lever arm 31 can be reliably connected with the bridge element 30.

FIGS. 5*a*-5*c* successively show the retaining of the ring gear 20 in normal operating condition. In case the activation element 50 is implemented as an elastic element 27 and comprises a small spring, the auxiliary driving motor 26 in normal operating condition receives current and can rotate clockwise. Via the worm 29 and the toothing 30*a* of the bridge element 30, the bridge element 30 rotates counterclockwise following arrow E. By counterclockwise rotation of the bridge element 30, the projecting element 38 of each of the lever arms 31 is pressed into the corresponding recess 39 of the ring gear 20. In normal operating condition, the auxiliary driving motor 26 always remains activated and so the auxiliary driving motor 26 always continues to keep the bridge element 30 in this position, as a result of which the projecting element 38 continues to be pressed in the corresponding recess 39. By counterclockwise rotation of the bridge element 30, the guide element 41 of the second arm part 31b moves along the guide surface 42 until it runs against the stop element 43. The bridge element 30 now cannot rotate further anymore, and by the lever action of the lever arm 31 around the pivot 37, the first arm part 31a is pressed towards the ring gear 20 in the direction of arrow F. As a result, the projecting element 38 engages in the recess 39 and is subject to a radial force towards the ring gear 20. Due to the continuous actuation of the auxiliary driving motor 26 during the normal operating condition, this force continues to act on the first arm part 31a, as a result of which a firm and reliable coupling of the projecting element 38 in the recess 39 can be effected, and the ring gear 20 is blocked. In this manner, the ring gear 20 can be secured. FIG. 5c shows that the guide element 41 has run against the stop element 43, and the corresponding positions of the pivot 37. The pivot 37 which is movable in the slot 44 has further been moved to an end of the slot 44. Due to the continuous energization of the auxiliary driving motor 26, against the force of small spring 27, the blocking device 32 remains in this blocking position during normal operation.

In case of a calamity, in a failsafe condition, the current supply to the auxiliary driving motor 26 stops and the auxiliary driving motor 26 receives no current anymore. The actuation of the auxiliary driving motor 26 in case of a failsafe condition is no more. As a result, the elastic element 27 which is pretensioned (biased) to the failsafe activation position of the auxiliary driving motor 26, can move and relaxes to the failsafe activation position. The elastic element 27 thus causes the auxiliary driving motor 26 to move counterclockwise. As the auxiliary driving motor 26 is moved counterclockwise, the bridge element can, via the worm 29 and the toothing 30a, be moved clockwise, in the direction of arrow G. By the rotation of the bridge element 30, the guide element 41 of the second arm part 31b of the lever arm 31 moves along the guide surface 42 away from the stop element 43. By the lever action around the pivot 37, the first arm part 31a rotates around the pivot 37 and the projecting element 38 comes out of the recess 39. The first arm part 31a thus moves out of the ring gear 20 in the direction of arrow H. As a result, the projecting element 38 and the recess 39 uncouple and the ring gear 20 is unblocked and released for rotation. The ring gear 20 is not retained anymore now and can rotate freely. FIG. 6c shows the position of the guide element 41, at the end of the guide surface 42 remote from the stop element 43. The pivot 37 has also been moved to the other end of the slot 44. It is noted that the relationship between the different rotational directions can also be a different one. This is possible depending on the view direction and/or of the pitch angle chosen, e.g., positive or negative, and/or of the position of the blocking device, etc. For example, if the blocking device is implemented in a mirrored fashion, the rotational directions become different. Or, if the rotational direction of the auxiliary driving motor is a different one, this has an influence on the further rotational directions.

As the ring gear 20 is now free to rotate, the energy that was stored and was retained in the energy storage element 33 can now be released also. For, the energy storage element 33 was biased to the failsafe position of the driving unit, and was being held in the biased position in that the coupling gear 35, with which the energy storage element 33 is fixedly connected by one end, was also being blocked in that it was in engagement with the—in normal operating condition— blocked ring gear 20. Now that the ring gear 20 in the failsafe condition has been released, the coupling gear 35 too can rotate freely, and the failsafe spring 33 can relax and thereby release the stored energy to cause the coupling gear 35 to move. By rotation of the coupling gear 35, the ring gear 20 also rotates, and hence the planet carrier 17 does. The planet carrier 17 is in engagement with the output shaft element 8 which is thereby also set in motion, as a result of which the air stream influencing element coupled therewith can be brought to the predefined failsafe position.

After the calamity is over, and there is no failsafe condition anymore, the auxiliary driving motor 26 receives power again. The auxiliary driving motor 26 can then start rotating clockwise again, thereby carrying out the sequence of FIGS. 5a-5c. By the rotation of the auxiliary driving motor 26, also the elastic element 27 is tensioned again; by the synchronized rotation of the main driving motor, also the failsafe energy storage element 33 is tensioned again. In this way, the failsafe mechanism 25 is reusable and it can be reset. This brings an advantage, since the adjustment device now does not have to be replaced after each calamity anymore. After a calamity, the adjustment device 1 can function normally again and the failsafe mechanism 25 is tensioned again and thereby made 'ready to go'.

FIG. 7 shows a second embodiment of the driving unit 3 according to the invention. The difference with respect to the embodiment of FIGS. 1-4 is that the activation element 50 is here implemented as comprising a number of capacitors 51. The capacitors 51 are three in total here, but provision can be made for one capacitor or two capacitors or even more than three. The capacitors 51 are here on the printed circuit board 6 and are connected via a connecting element 52, preferably two conductive sticks, with the electric contact points of the auxiliary driving motor 26. The other elements of the driving unit 3 remain unaltered. Also the method for blocking and unblocking the ring gear 20, as described with reference to FIGS. 5a-c and FIGS. 6a-c, is unchanged. Where elastic element 27 has been mentioned, activation element 50 or capacitor 51 may be read instead. For reasons of conciseness, the whole description of FIGS. 5a-c and FIGS. 6a-c is not repeated here.

It is to be noted, however, that due to the absence of the biased small spring 27, when the auxiliary driving motor 26 has adjusted the blocking device 32 into the blocking position, the auxiliary driving motor 26 can then be switched off. Advantageously, the auxiliary driving motor 26 is provided with a preferably self-locking drive, in consequence of which it is not necessary that the drive be permanently energized during normal use. For in the blocking position, there is no torsion on the shaft of the auxiliary driving motor, in consequence of which the auxiliary driving motor then does not need to be provided with current. Only in case of a calamity, in a failsafe situation, when the energy from the capacitors 51 is released, and the auxiliary driving motor 26 is adjusted to its own failsafe position, is the ring gear 20 unblocked by the blocking device 32, as a result of which the failsafe mechanism 25 can be further set in motion to eventually bring the output shaft of the driving unit 3 to the predefined failsafe position.

The drive of the auxiliary driving motor may be implemented as a self-locking drive or as a non self-locking drive, for both the embodiment with a small spring as activation element and the embodiment with a capacitor as activation element, but preferably as a self-locking drive.

The adjustment device has been elucidated hereinabove for an air stream influencing element, but may be implemented and applied in the same manner for an adjustment device for adjusting fluid influencing elements, such as a liquid valve which may for instance be placed in a pipe. It will be clear that the adjustment device can have many uses, in particular for adjustment of valves, such as liquid valves. An aspect of the invention therefore also concerns an adjustment device for adjusting a fluid influencing element, such as a valve, between at least a first position and a second position, comprising a driving unit for adjusting the fluid influencing element between at least the first position and the second position provided with an input shaft and an output shaft which is at a distance from the input axis, wherein the driving unit has a first part which is provided around the input axis of the driving unit, and has a second part, wherein the adjustment device is furthermore provided with a failsafe mechanism, wherein the failsafe mechanism engages the first part of the driving unit, wherein the failsafe mechanism comprises an auxiliary driving motor, separately from a main driving motor of the driving unit, and the auxiliary driving motor is provided with an elastic element which is pretensioned to a failsafe position. All the above-described aspects and variants, without exception and without adaptation, also apply to an adjustment device for a fluid influencing element. For clarity and conciseness, the description thereof has not been repeated for an adjustment device for a fluid influencing element.

For the purposes of clarity and a concise description, herein features have been described as part of the same or different embodiments, but it will be clear that the scope of protection of the invention can encompass embodiments with combinations of any or all of the features described. It will be appreciated that the embodiments shown have the same or similar components, apart from where they have been described as different.

In the claims, reference signs placed in parentheses shall not be construed as limiting for the claim. The word 'comprising' does not preclude the presence of other features or steps than those specified in a claim. Further, the words 'a(n)' and 'one' should not be construed as limiting to 'only one', but instead are used to indicate 'at least one', and do not preclude plurality. The mere fact that certain measures are recited in mutually different claims does not mean that a combination of these measures cannot be used to advantage. Many variants will be clear to one skilled in the art. All variants are understood to be comprised within the scope of protection of the invention as defined in the following claims.

REFERENCE SIGNS

A axis input shaft
B axis output shaft
C axis
E counterclockwise sense
G clockwise sense
F radial direction towards the ring gear
H radial direction away from the ring gear
1 adjustment device
2 housing
2a housing part
2b cover
3 driving unit
3a first part around input axis A
3b second part around output axis B
4 entry opening
5 corresponding connection element of the adjustment device
6 printed circuit board
7 exit opening
8 output shaft
8a output shaft element
9 input shaft
10 main driving motor
11 worm
13 rod-shaped element input shaft
14 sun gear
15 planetary gear system
16 planet gears
17 planet carrier
18 support element
19 external toothing planet carrier
20 ring gear
21 internal toothing ring gear
22 external toothing ring gear
22a recess in toothing
24 external toothing output shaft element
25 failsafe mechanism
26 auxiliary driving motor
26a input shaft auxiliary driving motor
26b output shaft auxiliary driving motor
27 elastic element auxiliary driving motor
28 small connecting block
29 worm
30 bridge element
30a external toothing bridge element
31 lever arm
31a first arm part
31b second arm part
32 blocking device
33 failsafe energy storage element
33a one end energy storage element
33b other end energy storage element
34 rod-shaped shaft element axis C
35 coupling gear
36 external toothing coupling gear
36a tooth in toothing
37 pivot lever arm
38 projecting element
39 recess in ring of ring gear
41 guide element second arm part lever arm
42 guide surface
43 end element
44 slot
50 activation element
51 capacitor
52 connecting element

The invention claimed is:

1. An adjustment device for adjusting an air stream influencing element of a motor vehicle between at least a first position and a second position, the adjustment device comprising:
a driving unit for adjusting the air stream influencing element between at least the first position and the second position, the driving unit including an input shaft having an input axis and an output shaft having an output axis which is at a distance from the input axis, wherein the driving unit has a first part which is provided around the input axis of the driving unit, and has a second part; and a failsafe mechanism, wherein the failsafe mechanism engages the first part of the driving unit, wherein the failsafe mechanism comprises an auxiliary driving motor, separately from a main driving motor of the driving unit, wherein the auxiliary driving motor includes an activation element for adjusting the auxiliary driving motor itself in case of failsafe and setting the failsafe mechanism in motion further.

2. The adjustment device according to claim 1, wherein the activation element is connected with a respective input shaft of the auxiliary driving motor.

3. The adjustment device according to claim 1, wherein the activation element is an elastic element.

4. The adjustment device according to claim 3, wherein the elastic element is a spring element which is pretensioned to a zero position of the auxiliary driving motor.

5. The adjustment device according to claim 1, wherein the activation element is connected with electrical contact points of the auxiliary driving motor.

6. The adjustment device according to claim 5, wherein the activation element comprises at least one capacitor for releasing energy to adjust the auxiliary driving motor in case of failsafe.

7. The adjustment device according to claim 1, wherein the auxiliary driving motor is arranged for solely driving the failsafe mechanism.

8. The adjustment device according to claim 1, wherein the input shaft of the driving unit is connected with the main driving motor and the output shaft of the driving unit is arranged to be connectible with the air stream influencing element.

9. The adjustment device according to claim 1, wherein the first part of the driving unit comprises a planetary gear system, comprising a sun gear, at least one planet gear, a planet carrier and a ring gear, wherein one element of the planetary gear system is connected with the input shaft.

10. The adjustment device according to claim 9, wherein the ring gear of the planetary gear system is detachably connected with a fixed world, wherein the fixed world is a housing of the adjustment device.

11. The adjustment device according to claim 9, wherein the second part of the driving unit comprises an output shaft element which forms the output shaft of the driving unit.

12. The adjustment device according to claim 11, wherein the output shaft element of the second part of the driving unit is coupled with a transmission ratio to an output of the planetary gear system, wherein the output of the planetary gear system is formed by one of the elements of the planetary gear system.

13. The adjustment device according to claim 1, wherein the failsafe mechanism comprises a blocking device for blocking an element of the first part of the driving unit in normal use and for releasing that element upon failsafe in case of a calamity.

14. The adjustment device according to claim 13, wherein the blocking device is couplable with the auxiliary driving motor.

15. The adjustment device according to claim 1, wherein the failsafe mechanism comprises a failsafe energy storage element in a form of an elastic element around an axis, which is at a distance from the input axis and from the output axis or coincides with the output axis.

16. The adjustment device according to claim 15, wherein the failsafe energy storage element is configured for cooperation with a coupling gear which is couplable with an element of the first part of the driving unit.

17. The adjustment device according to claim 16, wherein the coupling gear is couplable with a blockable element of the first part of the driving unit that is blocked by a blocking device of the failsafe mechanism in normal use and for releasing that element upon failsafe in case of a calamity.

18. The adjustment device according to claim 17, wherein the first part of the driving unit comprises a planetary gear system, comprising a sun gear, at least one planet gear, a planet carrier and a ring gear; and the blockable element of the first part of the driving unit is the ring gear.

19. The adjustment device according to claim 18, wherein the blocking device comprises at least one pivotable lever arm which is couplable with the blockable element.

20. The adjustment device according to claim 19, wherein the at least one pivotable lever arm is configured to engage in a corresponding recess of the blockable element of the first part of the driving unit.

21. The adjustment device according to claim 19, wherein the at least one pivotable lever arm is pivotably connected with a bridge which is rotatably receivable around the axis of the first part of the driving unit and is connectible with the auxiliary driving motor.

22. The adjustment device according to claim 16, wherein the coupling gear is positioned concentrically around the axis, which is at a distance from the input axis and from the output axis or coincides with the output axis.

23. A method for adjusting an air stream influencing element of the motor vehicle, comprising furnishing the adjustment device according to claim 1.

* * * * *